June 11, 1929.     B. D. CHAMBERLIN     1,716,517
AUTOMATICALLY FOCUSING ENLARGING CAMERA
Filed Dec. 23, 1926     2 Sheets-Sheet 1

INVENTOR,
Benjamin D. Chamberlin,
ATTORNEYS.

June 11, 1929.   B. D. CHAMBERLIN   1,716,517
AUTOMATICALLY FOCUSING ENLARGING CAMERA
Filed Dec. 23, 1926   2 Sheets-Sheet 2
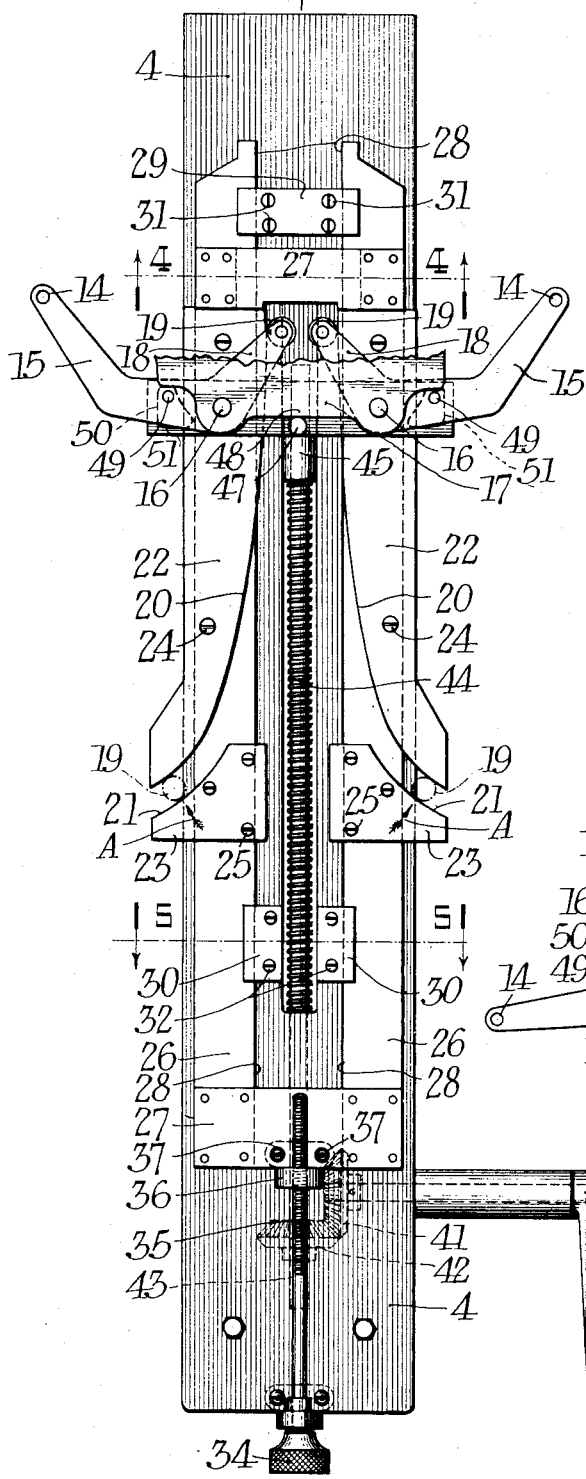
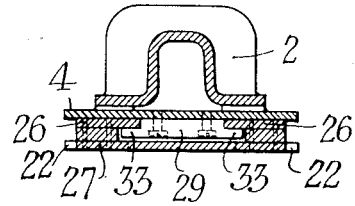
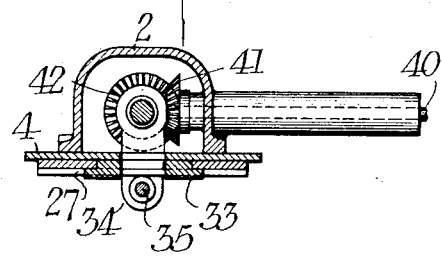
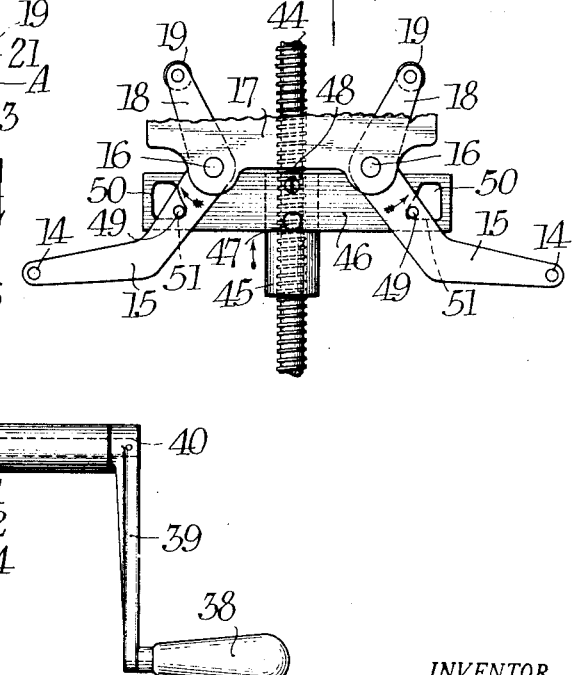
INVENTOR,
Benjamin D. Chamberlin,
BY
ATTORNEYS.

Patented June 11, 1929.

1,716,517

UNITED STATES PATENT OFFICE.

BENJAMIN D. CHAMBERLIN, OF ROCHESTER, NEW YORK, ASSIGNOR TO EASTMAN KODAK COMPANY, OF ROCHESTER, NEW YORK, A CORPORATION OF NEW YORK.

AUTOMATICALLY FOCUSING ENLARGING CAMERA.

Application filed December 23, 1926. Serial No. 156,716.

This invention relates to photography, and more particularly to enlarging cameras of the type in which the parts are mechanically moved and kept in focus for different sizes of projected images. One object of my invention is to provide an automatically focusing enlarger which will function satisfactorily at low magnifications. Another object is to provide such a machine in which cams and cam followers are provided for relatively adjusting the parts, there being a supplementary means for moving and keeping the cams and cam followers in contact through at least a portion of their movement. Another object is to provide a readily accessible means for altering the mechanism to care for lenses of different focal lengths, and other objects will appear hereinafter from the following specification, the novel features being pointed out in the claims at the end thereof.

Certain features of the enlarging machine used to illustrate my invention are similar to the enlarging camera shown in Patent No. 1,460,714, Fritts, July 3, 1923; the present invention being directed to improvements in this type machine.

Coming now to the drawings wherein like reference characters denote like parts throughout,—

Fig. 2 is a fragmentary front elevation of a preferred form of cam and cam follower by which the parts are kept in their proper relation;

Fig. 3 is a fragmentary front elevation of a supplemental cam follower moving mechanism;

Fig. 4 is a section on line 4—4 of Fig. 2; and

Fig. 5 is a section on line 5—5 of Fig. 2.

Figure 1:
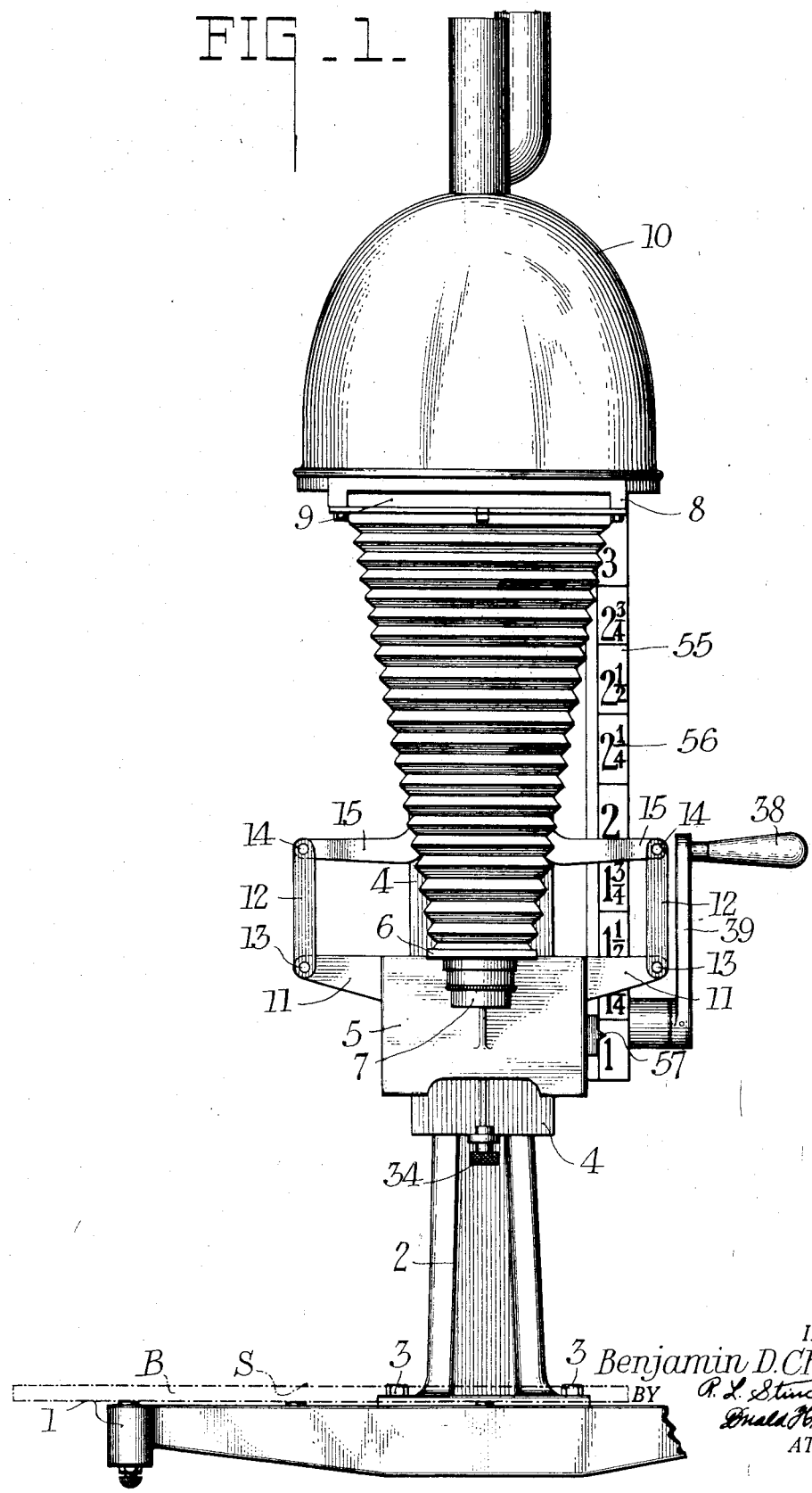
Fig. 1 is a front elevation of a typical enlarging machine into which a preferred embodiment of my invention has been built.

For the purpose of illustration I have shown the present enlarging camera to be of the same type as the enlarger shown in the Fritts patent, above mentioned, particularly the type shown in Fig. 9 of this patent.

The enlarger may consist broadly of a base 1 carrying a supporting bracket 2 which may be affixed to the brace by bolts 3. This bracket supports a plate 4 which is adapted to form a slide-way for the moving parts as described in the Fritts patent. There are two slidably mounted members,—first, member 5 providing a carriage from which a lens board 6 extends upwardly and into which an objective 7 may be screwed in the usual manner; and, second, a member 8 which is adapted to carry a negative holder 9. A suitable reflector 10 is carried by member 8 and this may be provided with the usual light source, such as an incandescent lamp (not shown). In order to keep an image projected from the negative holder 9 by the objective 7 upon a suitable support B having an image receiving plane S carried by the base 1, the slides 5 and 8 are interconnected in the following manner:

Slide 5 is provided with arms 11 to which the links 12 are pivoted at 13, these links being also pivoted at 14 to the bell crank levers 15 which are supported by studs 16 carried on the sliding carriage 17 to which member 8 is fixedly attached. The ends 18 of the bell crank levers are provided with cam followers which in the present instance are formed by rollers 19. These rollers are adapted to engage the cam surfaces 20 and at the lower extent of their movement also to engage the cam surfaces 21. Thus at the lower end the rollers engage a cam slot which extends between the cam surfaces 20 and 21.

The cam surfaces 20 and 21 are carried by plates 22 and 23, which, for convenience of manufacture, are preferably made in separate parts as shown, and which are mounted in fixed relation by means of screws 24 and 25 which pass into parallel plates 26 connected together at their ends by means of the plates 27 to form a carriage for the cams. The inner edges 28 of plates 26 are preferably parallel and may slide upon the rails 29 and 30 which are affixed to the plate 4 by screws 31 and 32.

As best shown in Figs. 4 and 5, plates 29 and 30 each have flanges 33 which lie over the edges of plates 26, and confining the movement of these plates to a fixed path. When it is desired to move the cam structure the adjusting screw 34 may be turned so that the threaded portion 35 which engages a threaded lug 36 attached to the lower plate 27 by means of screws 37, when the screw 34 is turned, will move upon the rails 30 and 31.

In the manufacture of high grade objectives, there is usually considerable variation in the focal lengths of objectives designed to be of the same focal length. The adjustment to the cams above described is primarily for taking care of the manufacturing variations in the focal length of such objectives. It is possible to use lenses having different focal lengths, although the parts cannot be sufficiently adjusted for lenses of widely different focal lengths from that for which the particular machine was designed.

In order to adjust the machine for different sized enlargements there is provided a handle 38 attached to an arm 39 which is pinned to shaft 40, shaft 40 being adapted to turn bevel gears 41 and 42; the latter gear being affixed to a shaft 43, the greater part of which is threaded to form a screw 44. A nut 45 is threaded to move on screw 44, and this nut is attached to a cross bar 46 which carries an upstanding pin 47.

Through the major part of the possible total movement, pin 47 contacts with a lower edge 48 of the slide 17 which supports the negative holder, reflector, and lamp. Thus when handle 38 is turned screw 44 will transmit motion to member 17, and this slidable member through the bell crank levers 15, links 12, and arms 11 will transmit motion to the slide 5 which carries the objective.

When the cam followers 19 are moved to the lower extent of their movement, as indicated by dot and dashed lines in Fig. 2, an upward thrust upon the slide 17 would tend to move the cam followers in the direction shown by the arrows A. Such a thrust would tend to cause the rollers to bind on the cam edge 20 and for this reason contact with pin 47 and the carriage 17 would not cause the desired movement. This only occurs where the magnification is small or where the projected image is the same size or smaller than the negative.

To overcome such binding tendency at low magnifications, I have provided a supplemental means for moving the cam followers along the cams. As best shown in Fig. 3, this consists of a pin and slot connection between the bell crank levers and the ends of plate 46. The bell crank levers 15 are provided with downwardly extending pins 49 which pass into the slots 50 in member 46. In Fig. 3 the parts are in the position they would assume when the projected image is approximately the same size as the negative. In this position it will be noted that pin 47 is some distance away from the edge 48 of slide 17. An upward movement of nut 45 will transmit movement to slide 17 through bell crank levers 15 in the following manner: The pins 49 will lie in contact with the lower edge 51 of the cutouts 50, thus there is exerted upon the cam followers 19 a force tending to rotate the bell crank levers about their pivots 16 in the direction shown by the arrows, Fig. 3. This tends to move the rollers 19 together.

As the nut 45 is moved upwardly and the rollers 19 follow the converging sides of the cams 20, the pin 47 will approach the slide 17 so that before the nut has been moved far the pin 47 will contact with and transmit motion to the slide 17. For the greater part of the upward movement pin 47 contacts with edge 48, as indicated in Fig. 2. It will thus be seen that the supplemental cam follower moving mechanism permits the parts to move to a position where enlargements can be made or to a position in which reductions can be made. This structure, that is, pins 49 and apertures 50 constitute a lost motion connection between levers 15 and plate 46.

In the drawing I have shown a scale 55 having suitable graduations 56 to indicate the size of the projected image, a pointer 57 carried by the slide 5 pointing to the graduation on the scale. While I have indicated the lowest magnification to be one to one, that is, the projected image can be made the same size as the negative, it will be obvious that by extending the cam 20 reductions can be made if so desired.

It should be especially noticed that while I provide a supplemental means for moving the cam follower during a portion of their movement, this means is entirely automatic, and does not require the operator to move or adjust any supplementary parts, the entire range of movement being accomplished by merely turning handle 38.

The operation of my machine is as follows: An objective 7 preferably of a focal length recommended for the machine is placed on the lensboard 6, and the screw 34 is turned until an image appears sharp on the support. The handle 38 is then turned and if the screw 34 has been properly adjusted the image will remain sharp throughout the range of movement of the parts. Adjustment can be readily made at any time by turning the screw 34.

During the greater part of the movement motion is transmitted to slide 17 through contact with its lower edge 48 of pin 47. When, however, the bell crank levers reach a position in which cam followers 19 would tend to bind against the cam track 20 (when the parts are being moved upwardly) member 46 through the pin and slot connections with the bell crank levers move slide 17 through bell crank levers, and thus not only transmits motion to part 17, but in addition moves and turns the arms supporting the cam followers so that they will not bind with the cams.

While I have illustrated in the drawings, and described in the specification a preferred embodiment of my invention applying it to a well known type of enlarger, certain features of my invention may be also applied to automatically focusing enlargers of different types. I, therefore, claim as within the scope of my invention all such forms as may come within the scope of the following claims.

Having thus described my invention, what I claim as new and desire to secure by Letters Patent is,—

1. In an automatically focusing camera, a pair of slidable members adapted to hold a negative and an objective, connections between the two slides by which they may be differentially moved to retain an image sharply focused in a plane, said connections including a cam surface and a lever, an end of the lever constituting a cam follower, means operative on one slide to move said slide and thereby move both slides through said connections, and supplementary means operative on the lever to move the lever and thereby move both slides.

2. In an automatically focusing camera, a pair of slidable members adapted to hold a negative and an objective, connections between the two slides by which they may be differentially moved to retain an image sharply focused in a plane, said connections including a cam surface, and a lever, an end of the lever constituting a cam follower, means for moving the two slides including a power operated member, elements on the power operated member, one slide and the lever, cooperating to transmit power from the power member to a slide directly, or from the power member to a slide through a lever.

3. In an automatically focusing camera, a pair of slidable members adapted to hold a negative and an objective, connections between the two slides by which they may be differentially moved to retain an image sharply focused in a plane, said connections including a cam surface, and a lever, an end of the lever constituting a cam follower, means for moving the slides including a power operated member, and parts carried by the power operated member, one slide and the lever whereby the slide may be directly acted upon by the power member during a portion of the focusing movement and the lever may be directly acted upon during a portion of the focusing movement.

4. In an automatically focusing camera, a pair of slidable members adapted to hold a negative and an objective, connections between the two slides by which they may be differentially moved to retain an image sharply focused in a plane, said connections including a pivoted lever carried by one slide and connected to the other slide, said lever including a cam follower member, a cam against which the cam follower may contact, as the slides are moved through a predetermined range of movement, and means for moving the slides including a power operated element, parts of which cooperate with one of the slides and with the lever, whereby force to move the slides may be applied by the power element to one of the slides through a portion of their movement, and to the lever through another portion of the movement of the slides.

5. In an automatically focusing camera, a pair of slidable members adapted to hold a negative and an objective, connections between the two slides by which they may be differentially moved to retain an image sharply focused in a plane, said connections including a pivoted lever carried by one slide and connected to the other slide, said lever including a cam follower member, a cam against which the cam follower may contact, as the slides are moved through a predetermined range of movement, and means for moving the slides including a power operated element having parts adapted to contact with one of the slides and with the pivoted lever, said parts being positioned to drive the slide through contact therewith through the greater part of the range of movement of the slides, and to drive the slide through the pivoted lever through a smaller part of the range of movement of the slides.

6. In an automatically focusing camera, a pair of slidable members adapted to hold a negative and an objective, connections between the two slides by which they may be differentially moved to retain an image sharply focused in a plane, said connections including a cam surface, a pivoted lever, an end of the lever constituting a cam follower, and a power operated element adapted to move the slides, said element having a part adapted to contact with a slide and a lost motion connection between the element and the pivoted lever, whereby the lever may be alternately turned about its pivot through the lost motion connection or through contact of the power operated element and the slide.

7. In an automatically focusing camera, a pair of slidable members adapted to hold a negative and an objective, connections between the two slides by which they may be differentially moved to retain an image sharply focused in a plane, said connections including a cam surface, a pivoted lever, an end of the lever constituting a cam follower, and a power operated element adapted to move the slides, said element having parts alternatively cooperating with one slide and with said pivoted lever, whereby power may be transmitted through one slide or through the lever.

8. In an automatically focusing camera, a pair of slidable members adapted to hold a negative and an objective, connections between the two slides by which they may be differentially moved to retain an image sharply focused in a plane, said connections including a cam surface, a pivoted lever, an end of the lever constituting a cam follower, and a power operated element adapted to move the slides, said element having parts alternatively co-operating with one of the slides or with the pivoted lever according to the position of the parts.

9. In an automatically focusing camera, a pair of slidable members adapted to hold a negative and an objective, connections between the two slides by which they may be differentially moved to retain an image sharply focused in a plane, said connections including a pivoted lever carried by one slide and connected to the other slide, said lever including a cam follower member, a cam against which the cam follower may contact, a power operated element, a lost motion connection between the said element and lever, means including the power element and lost motion connection for alternatively operating a slide by contact with the power element or by the lever through the lost motion connection.

10. In an automatically focusing camera, a pair of slidable members adapted to hold a negative and an objective, connections between the two slides by which they may be differentially moved to retain an image sharply focused in a plane, said connections including a pivoted lever carried by one slide and connected to the other slide, said lever including a cam follower member, a cam against which the cam follower may contact, a power element, a lost motion connection between the power element and a lever, means for moving the slides and slide connecting mechanism alternatively by direct contact of the power element and a slide, and by the power element transmitting motion to the lever through the lost motion connection.

11. In an automatically focusing camera, a support, a pair of slidable members carried by the support adapted to hold a negative and an objective, connections between the two slides for moving them differentially with respect to an image plane including a pair of bell crank levers carrying cam followers, a cam member having a pair of cam faces adapted to be contacted by the cam followers, a carrier to which the cam is affixed, rails attached to the support upon which the carrier may move, and an adjusting screw joining the carrier and support for moving the latter to focus an objective.

12. In an automatically focusing camera, a pair of slidable members adapted to hold a negative and an objective, connections between the two slides by which they may be differentially moved to retain an image sharply focused in a plane, said connections including a pivoted lever carried by one slide and connected to the other slide, a slide moving mechanism including a handle for transmitting power to the moving mechanism, said mechanism including a movable plate adapted to contact with a slide, and a lost motion connection between the pivoted lever and the movable plate whereby the slides may be relatively adjusted through the lever as the lever is moved through the lost motion connection.

Signed at Rochester, New York, this 17th day of December, 1926.

BENJAMIN D. CHAMBERLIN.